United States Patent
Oh et al.

(10) Patent No.: US 10,916,781 B2
(45) Date of Patent: Feb. 9, 2021

(54) COMPOSITION FOR MANUFACTURING ELECTRODE OF MEMBRANE-ELECTRODE ASSEMBLY FOR FUEL CELLS AND METHOD FOR MANUFACTURING ELECTRODE OF MEMBRANE-ELECTRODE ASSEMBLY FOR FUEL CELLS USING THE SAME

(71) Applicants: Hyundai Motor Company, Seoul (KR); Kia Motors Corporation, Seoul (KR)

(72) Inventors: Jongkil Oh, Gyeonggi-do (KR); Sukhwan Yun, Gyeonggi-do (KR); Bo Ki Hong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/128,023

(22) Filed: Sep. 11, 2018

(65) Prior Publication Data
US 2019/0312284 A1  Oct. 10, 2019

(30) Foreign Application Priority Data
Apr. 10, 2018  (KR) .................. 10-2018-0041576

(51) Int. Cl.
*H01M 4/00* (2006.01)
*H01M 4/88* (2006.01)
(Continued)

(52) U.S. Cl.
CPC ....... *H01M 4/8878* (2013.01); *H01M 4/8605* (2013.01); *H01M 4/8657* (2013.01);
(Continued)

(58) Field of Classification Search
CPC ... H01M 4/8878; H01M 4/881; H01M 4/8828
See application file for complete search history.

(56) References Cited

U.S. PATENT DOCUMENTS

| 7,622,217 B2 | 11/2009 | Debe et al. |
| 2008/0020923 A1 | 1/2008 | Debe et al. |
| | (Continued) | |

FOREIGN PATENT DOCUMENTS

| JP | 4655168 B1 * | 3/2011 | .......... H01M 4/8652 |
| KR | 20170053490 A | 5/2017 | |
| | (Continued) | | |

OTHER PUBLICATIONS

Full machine translation of JP4655168B1 (Year: 2011).*
(Continued)

*Primary Examiner* — Milton I Cano
*Assistant Examiner* — Mary G Henshaw
(74) *Attorney, Agent, or Firm* — Brinks Gilson & Lione

(57) ABSTRACT

Described herein is a composition for manufacturing an electrode of a membrane-electrode assembly for fuel cells and a method for manufacturing an electrode of a membrane-electrode assembly for fuel cells including the same. More particularly, described herein is a composition for manufacturing an electrode of a membrane-electrode assembly for fuel cells which can improve porosity in the electrode and thereby mass transport capability of reactive gases by mixing a second carbon having lower crystallinity than a first carbon to produce an electrode and applying a voltage to the electrode to remove only the second carbon, and a method for manufacturing an electrode of a membrane-electrode assembly for fuel cells including the same.

10 Claims, 2 Drawing Sheets

(51) Int. Cl.
  *H01M 4/86* (2006.01)
  *H01M 4/90* (2006.01)
  *H01M 8/1018* (2016.01)

(52) U.S. Cl.
  CPC ......... *H01M 4/8668* (2013.01); *H01M 4/881* (2013.01); *H01M 4/8828* (2013.01); *H01M 4/9041* (2013.01); *H01M 4/9083* (2013.01); *H01M 2008/1095* (2013.01)

(56) References Cited

U.S. PATENT DOCUMENTS

2010/0047668 A1  2/2010  Steinbach et al.
2018/0097238 A1*  4/2018  Kongkanand ....... H01M 4/8878

FOREIGN PATENT DOCUMENTS

| KR | 101764069 A1 | 8/2017 |
| KR | 20170089486 A | 8/2017 |
| KR | 20170111635 A | 10/2017 |
| KR | 20170114610 A | 10/2017 |
| WO | WO2017175891 A1 | 10/2017 |

OTHER PUBLICATIONS

Full machine translation of KR-20170089486-A (Year: 2017).*
Macauley et al, Carbon Corrosion in PEM Fuel Cells and the Development of Accelerated Stress Tests, published by the Journal of the Electrochemical Society, vol. 165, issue 6 (Year: 2018).*
Shigeaki Murata, et al., "Vertically aligned carbon nanotube electrodes for high current density operating proton exchange membrane fuel cells," Journal of Power Sources, 253 (2014) 104-113.
Junbing Yang, et al., "Polymer Electrolyte Fuel Cell with Vertically Aligned Carbon Nanotubes as the Electrocatalyst Support," Electrochemical and Solid-State Letters, 13 (6) B55-B57 (2010).

* cited by examiner

[FIG. 1]
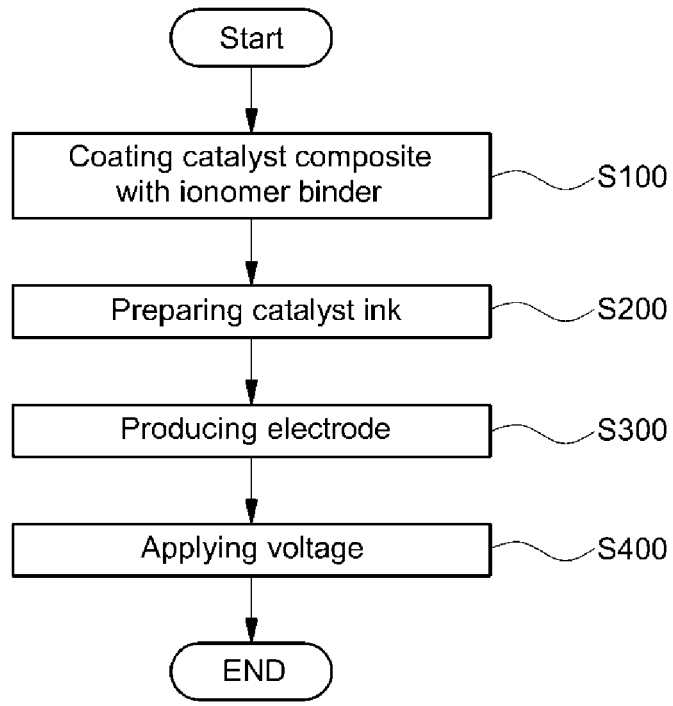
[FIG. 2A]
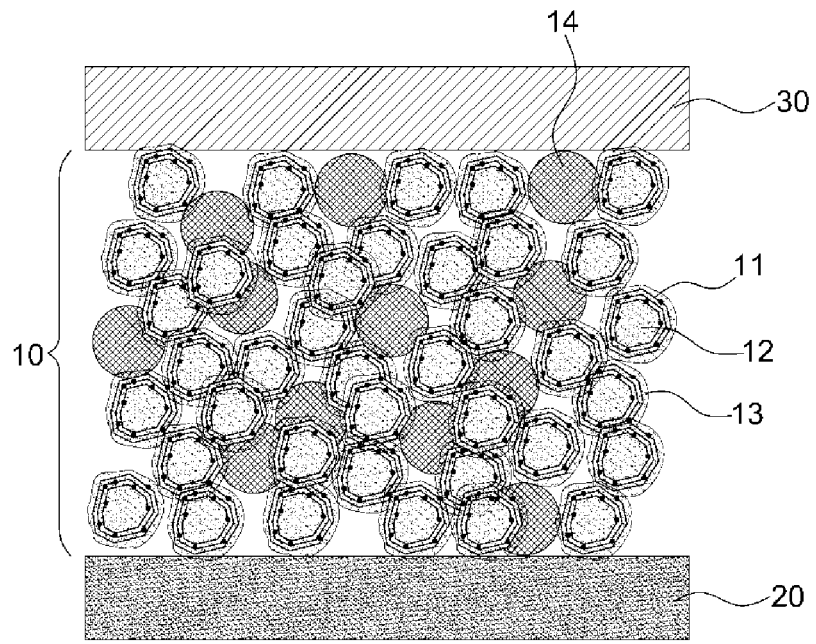

[FIG. 2B]
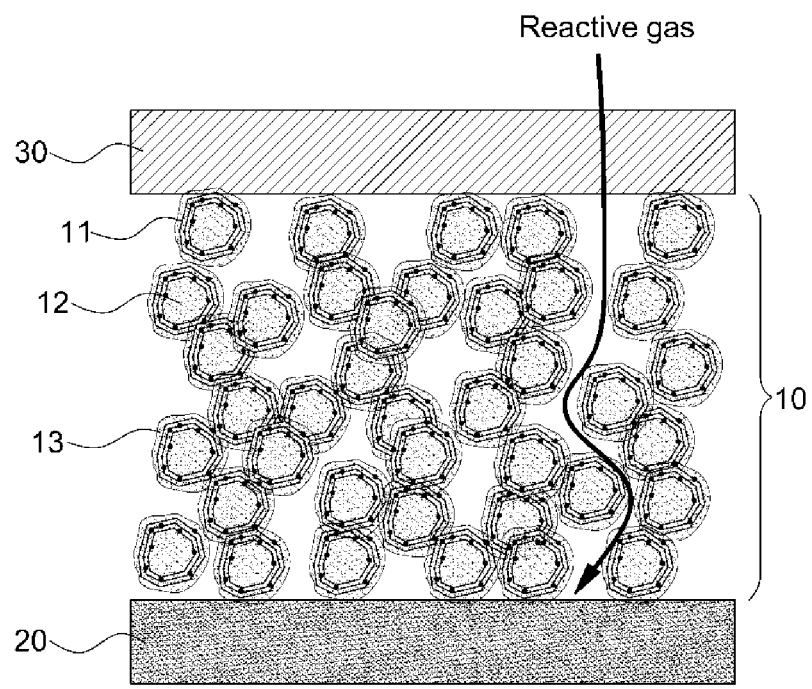

COMPOSITION FOR MANUFACTURING ELECTRODE OF MEMBRANE-ELECTRODE ASSEMBLY FOR FUEL CELLS AND METHOD FOR MANUFACTURING ELECTRODE OF MEMBRANE-ELECTRODE ASSEMBLY FOR FUEL CELLS USING THE SAME

CROSS-REFERENCE TO RELATED APPLICATION

This application claims priority to and the benefit of Korean Patent Application No. 10-2018-0041576 filed on 10 Apr. 2018, the entire contents of which are incorporated herein by reference.

FIELD

The present disclosure relates to a composition for manufacturing an electrode of a membrane-electrode assembly for fuel cells.

BACKGROUND

The statements in this section merely provide background information related to the present disclosure and may not constitute prior art.

The most generally used fuel cells for vehicles are polymer electrolyte membrane fuel cells (PEMFCs). In order for polymer electrolyte membrane fuel cells to normally exert a high power of at least several tens of kW under various driving conditions, they stably operate within a wide current density range.

In order to satisfy the power levels desired for fuel cells, the fuel cells are used in the form of a stack assembled by laminating unit cells. Each unit cell of the polymer electrolyte membrane fuel cell includes a membrane electrode assembly (referred to as "MEA"), which includes a polymer electrolyte membrane capable of moving protons and electrodes attached to opposite surfaces of the polymer electrolyte membrane, a gas diffusion layer (GDL) for supplying reaction gases, such as fuel gas and oxidizing gas, to the membrane electrode assembly and transmitting generated electrical energy, a gasket for maintaining airtightness of the reaction gases and coolant, a fastening member for maintaining appropriate fastening pressure, and a bipolar plate (BP) for moving the reaction gases and the coolant. A plurality of cells is stacked, and end plates for supporting the cells are coupled to the outermost ends of the stacked cells.

The electrochemical reaction to generate electricity of fuel cells occurs in a MEA including a perfluorinated sulfonic acid (PFSA) ionomer-based membrane and a pair of electrodes, that is, an anode/cathode. In general, the electrode used for fuel cell electric vehicles includes a Pt catalyst and a carbon support to induce fuel cell reaction and an ionomer binder to connect these Pt catalysts and carbon supports. A perfluorinated sulfonic acid is also generally used as an ionomer binder for the electrode.

The electrochemical reaction of a fuel cell will occur, as depicted by the following Reaction Scheme 1. Hydrogen supplied to an oxidation electrode, i.e., an anode of the fuel cell, is spilt into a proton and an electron by hydrogen oxidation reaction (HOR). The proton is moved through a membrane to a reduction electrode, that is, a cathode, while the electron is moved through an exterior circuit to the cathode. The proton and the electron react with oxygen gas supplied from the outside by oxygen reduction reaction (ORR) at the cathode to produce electricity and heat and, at the same time, produce water as a by-product, as depicted by Reaction Scheme 2:

[Reaction Scheme 1]

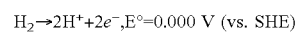
$$H_2 \rightarrow 2H^+ + 2e^-, E^\circ = 0.000 \text{ V (vs. SHE)} \quad [1]$$

[Reaction Scheme 2]

$$\tfrac{1}{2}O_2 + 2H^+ + 2e^- \rightarrow H_2O, E^\circ = 1.229 \text{ V (vs. SHE)} \quad [2]$$

wherein $E^\circ$ represents a standard electrode potential and SHE represents a standard hydrogen electrode.

A region where electrochemical performance of a fuel cell is shown is classified into three regions. First is an "activation loss" region caused by electrochemical reaction rate loss, second is an "Ohmic loss" region resulting from increased electrical contact resistance at the interface of each element and ionic resistance of the polymer electrolyte membrane, and third is a "mass transport loss" or "concentration loss" region caused by limited mass transport capability of reactive gases.

Of these, mass transport loss affects the performance of high current density regions of fuel cells and has various causes. For example, when water produced by electrochemical reaction is present in an appropriate amount in the electrode, the water maintains humidification of MEA. However, if excess water is not properly removed, flooding may occur. The flooded water prevents reactive gases from being effectively supplied into the fuel cell, thus causing voltage loss by mass transport loss.

Other conventional technologies to improve diffusion of reactive gas by introducing vertically aligned carbon nanotubes (VACNTs) as a support of a Pt catalyst have been suggested. However, these methods may be associated with increased manufacturing costs and unsuitability for mass-production due to additional manufacturing process and complicated process.

In general, regarding an electrode for fuel cells, reactive gases are moved through a gas diffusion layer to a Pt catalyst in the electrode and appropriate pores are required to effectively move reactive gases and water, produced as a result of fuel cell reaction. However, we have discovered that conventional electrodes undergo voltage loss by mass transport loss due to lack of pores. In particular, such a phenomenon is remarkably observed in a high current density region where more reactive gases are supplied and thus a great amount of water is produced.

The above information disclosed in this Background section is provided only for enhancement of understanding of the background of the disclosure and therefore it may contain information that does not form the prior art that is already known in this country to a person of ordinary skill in the art.

SUMMARY OF THE DISCLOSURE

The present disclosure provides a composition for manufacturing an electrode of a membrane-electrode assembly for fuel cells including a second carbon for formation of pores.

The present disclosure provides a method for manufacturing an electrode of a membrane-electrode assembly for fuel cells which can exhibit improved mass transport capability of reactive gases by forming pores in the electrode for fuel cells in a simple manner.

The present disclosure will be understood from the following description, and may be implemented as defined in the claims, and a combination thereof.

In one aspect, the present disclosure provides a composition for manufacturing an electrode of a membrane-electrode assembly for fuel cells including a catalyst composite including a first carbon and a catalyst metal supported on the first carbon, an ionomer binder coating the catalyst composite, a second carbon, and a solvent.

The first carbon may include at least one selected from the group consisting of carbon black (CB), carbon nanotube (CNT), carbon nanofiber (CNF), carbon nanowire (CNW), carbon nanohorn (CNH) and graphene.

The catalyst metal may include at least one selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo) and yttrium (Y).

The second carbon may include at least one selected from the group consisting of carbon black, carbon nanotube, carbon nanofiber, carbon nanowire and carbon nanohorn.

The second carbon may have an at least 10% lower degree of crystallinity than the first carbon.

The solvent may be at least one alcohol selected from the group consisting of isopropyl alcohol (IPA), normal propyl alcohol (nPA) and ethyl alcohol, deionized water, or a mixture thereof.

The ionomer binder may be present in an amount of 10 to 50% by weight and the second carbon may be present in an amount of 0.1 to 50% by weight, based on the total weight (%) of the catalyst composite, the ionomer binder and the second carbon.

In another aspect, the present disclosure provides a method for manufacturing an electrode of a membrane-electrode assembly for fuel cells including coating a catalyst composite comprising a first carbon and a catalyst metal supported on the first carbon with an ionomer binder, mixing the ionomer binder-coated catalyst composite with a second carbon and a solvent to prepare a catalyst ink, producing an electrode using the catalyst ink, and applying a voltage to the electrode to remove the second carbon.

The first carbon may include at least one selected from the group consisting of carbon black, carbon nanotube, carbon nanofiber, carbon nanowire, carbon nanohorn and graphene.

The catalyst metal may include at least one selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo) and yttrium (Y).

The coating the ionomer binder may include preparing a solution consisting of the catalyst composite, an ionomer binder and a solvent, and drying and heat-treating the solution.

The heat-treatment may be carried out at a temperature from an alpha transition temperature of the ionomer binder to an alpha transition temperature+100° C. for 10 minutes to 10 hours.

The second carbon may include at least one selected from the group consisting of carbon black, carbon nanotube, carbon nanofiber, carbon nanowire and carbon nanohorn.

The second carbon may have an at least 10% lower degree of crystallinity than the first carbon.

The solvent may be at least one alcohol selected from the group consisting of isopropyl alcohol, normal propyl alcohol and ethyl alcohol, deionized water, or a mixture thereof.

The catalyst ink may include 10 to 50% by weight of the ionomer binder and 0.1 to 50% by weight of the second carbon, based on the total weight (%) of the catalyst composite, the ionomer binder and the second carbon.

The removal of the second carbon may be carried out at a relative humidity (RH) of 70% or more.

The removal of the second carbon may be carried out by applying a voltage of 1.0V to 1.6V to the electrode for 5 seconds to 2 minutes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 1 is a flowchart illustrating a method for manufacturing an electrode of a membrane-electrode assembly for fuel cells according to the present disclosure;

FIG. 2A is a sectional view illustrating a membrane-electrode assembly including the electrode of a membrane-electrode assembly for fuel cells before removal of second carbon in the electrode; and FIG. 2B is a sectional view illustrating a membrane-electrode assembly including the electrode of a membrane-electrode assembly for fuel cells, showing formation of sufficient pores after removal of second carbon in the electrode.

The drawings described herein are for illustration purposes only and are not intended to limit the scope of the present disclosure in any way.

DETAILED DESCRIPTION

The present disclosure will be understood with reference to the annexed drawings. However, the present disclosure is not limited strictly to the forms disclosed herein.

Like reference numbers refer to like elements throughout the description of the figures. In the drawings, the sizes of structures are exaggerated for clarity. It will be understood that, although the terms "first", "second", etc. may be used herein to describe various elements, these elements should not be limited by these terms and are used only to distinguish one element from another. For example, within the scope defined by the present disclosure, a first element may be referred to as a second element and similarly, a second element may be referred to as a first element. Singular forms are intended to include plural forms as well unless context clearly indicates otherwise.

It will be further understood that the terms "comprises", "has" and the like, when used in this specification, specify the presence of stated features, number, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" modifies all the numbers, figures and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The present disclosure relates to a method for manufacturing an electrode of a membrane-electrode assembly for fuel cells, which can improve porosity in the electrode by a simple process including mixing a second carbon having lower crystallinity than a catalyst metal-supported first carbon to produce an electrode and applying a voltage to the electrode to remove only second carbon by carbon corrosion. In addition, the method has advantages of improving the porosity of the electrode and thus enhancing mass transport capability of reactive gases.

FIG. 1 is a flowchart illustrating a method for manufacturing an electrode of a membrane-electrode assembly for fuel cells according to the present disclosure. Referring to this drawing, the manufacturing method of an electrode for a membrane-electrode assembly may include coating a catalyst composite with an ionomer binder (S100), preparing a catalyst ink (S200), producing an electrode (S300) and applying a voltage to the electrode (S400).

More specifically, the present disclosure relates to a method for manufacturing an electrode of a membrane-electrode assembly for fuel cells, which includes: coating a catalyst composite including a first carbon and a catalyst metal supported on the first carbon with an ionomer binder; mixing the ionomer binder-coated catalyst composite with a second carbon and a solvent to prepare a catalyst ink; producing an electrode using the catalyst ink; and applying a voltage to the electrode to remove the second carbon.

Hereinafter, respective steps to manufacture the electrode of a membrane-electrode assembly for fuel cells according to the present disclosure will be described in more detail with reference to FIG. 1.

1) Coating Ionomer Binder (S100)

The step of coating an ionomer binder (S100) may include coating a catalyst composite including a first carbon and a catalyst metal supported on the first carbon with an ionomer binder. More specifically, the coating ionomer binder may include preparing a mixture consisting of the catalyst composite, an ionomer binder and a solvent, and drying and heat-treating the mixture.

The first carbon used in the present disclosure may include one or more selected from the group consisting of carbon black, carbon nanotube, carbon nanofiber, carbon nanowire, carbon nanohorn and graphene, and functions to support the catalyst metal. In addition, the catalyst metal may include one or more selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo) and yttrium (Y).

In the step of the preparing a mixture, the mixture can be prepared by adding the catalyst composite and the ionomer binder to the solvent, thoroughly stirring the resulting mixture at room temperature with a stirrer and subjecting the reaction solution to ultrasonication.

The solvent may be at least one alcohol selected from the group consisting of isopropyl alcohol, normal propyl alcohol and ethyl alcohol; deionized water; or a mixture thereof.

In the step of drying and heat-treating the mixture, the mixture may be dried to remove the solvent, and the residue (including obtained catalyst composite and ionomer binder) in the form of a cake may be heat-treated in a dryer to coat the entire surface of the catalyst composite with the ionomer binder.

The heat-treatment may be carried out at a temperature from an alpha transition temperature of the ionomer binder to an alpha transition temperature+100° C. for 10 minutes to 10 hours. The alpha transition temperature (Tα) means a temperature at which crystallinity of a polymer rapidly changes. The alpha transition temperature may vary depending on the structure and kind of the ionomer. When the temperature of the heat-treatment is lower than the alpha transition temperature of the ionomer binder, the catalyst composite and the ionomer binder may be separated from each other upon re-dispersion in a solvent due to weak binding force therebetween. On the other hand, when the heat-treatment temperature is higher than the alpha transition temperature+100° C., thermal degradation of the ionomer binder is accelerated, or the ionomer binder may not be redispersed in the solvent due to excessive increase in degree of crystallinity of the ionomer binder and thus decreased solubility. In addition, when manufacturing a membrane-electrode assembly, an interfacial adhesion of the electrolyte membrane may be decreased. The heat-treatment temperature may range from the alpha transition temperature of the ionomer binder to the alpha transition temperature+50° C.

In addition, the heat-treatment may be carried out for 10 minutes to 10 hours. When the heat-treatment time is shorter than 10 minutes, heat-treatment effects may be insufficient, and when the heat-treatment time is longer than 10 hours, thermal degradation of the ionomer binder may be accelerated, crystallinity is excessively increased or process cycle time is increased. Heat treatment of the mixture may be carried out for 30 minutes to 5 hours.

The ionomer binder may be a perfluorinated sulfonic acid ionomer (PFSA), a hydrocarbon ionomer or a mixture thereof, such as a perfluorinated sulfonic acid ionomer.

The perfluorinated sulfonic acid ionomer (PFSA) or hydrocarbon ionomer may have an alpha transition temperature of 60 to 130° C. The range of the alpha transition temperature may vary depending on the type and structure of the ionomer and the present disclosure is not limited thereto.

2) Preparing Catalyst Ink (S200)

The step of preparing a catalyst ink (S200) may include mixing the ionomer binder-coated catalyst composite with a second carbon and a solvent to prepare a catalyst ink. At this time, the second carbon may include one or more selected from the group consisting of carbon black, carbon nanotube, carbon nanofiber, carbon nanowire and carbon nanohorn.

The second carbon may have an at least 10% lower degree of crystallinity than the first carbon. Here, the degree of crystallinity means a weight proportion of a crystalline part with respect to the total content including the crystalline part and an amorphous part.

The second carbon used should have an at least 10% lower degree of crystallinity than the first carbon in order to effectively remove the second carbon in the following step of applying a voltage to the electrode (S400). Specifically, when the degree of crystallinity of the second carbon is the same or 10% lower than that of the first carbon, the second carbon, which may form pores in the electrode, and the first carbon, which is a support of the catalyst metal, can be simultaneously removed by corrosion in the applying a voltage to the electrode (S400). For this reason, the catalyst metal may be detached from the first carbon and lost, or catalyst metal particles agglomerate together, resulting in deterioration of catalyst performance and thus performance of fuel cells. The second carbon may have an at least 20% lower degree of crystallinity than the first carbon. As a result, the first carbon may have a higher crystallinity than the second carbon. Conversely, the second carbon may have a lower crystallinity than the first carbon.

The solvent may be at least one alcohol selected from the group consisting of isopropyl alcohol, normal propyl alcohol and ethyl alcohol, deionized water, or a mixture thereof.

The catalyst ink may include 10 to 50% by weight of the ionomer binder and 0.1 to 50% by weight of the second carbon, based on the total weight (%) of the catalyst composite, the ionomer binder and the second carbon.

The ionomer binder may be used in an amount of 10 to 50% by weight. When the content of the ionomer binder is less than 10% by weight, the catalyst composite may not be sufficiently connected or bound into a three dimensional network structure. On the other hand, when the content is higher than 50% by weight, excess ionomer binder may clog pores in the electrode, thus flooding the electrode. In one aspect, the ionomer binder may be used in an amount of 20 to 35% by weight.

The second carbon may be present in an amount of 0.1 to 50% by weight, because, when the content of the second carbon is less than 0.1% by weight, fewer pores are formed in the electrode, making improvement in mass transport capability insufficient. When the content is higher than 50% by weight, excessive pores are formed in the electrode, potentially causing structural collapse of the electrode. The second carbon may be present in an amount of 0.5 to 20% by weight.

3) Producing Electrode (S300)

The step of producing an electrode (S300) may include producing an electrode using the catalyst ink. The method of producing the electrode in step (S300) may be one of a variety of methods such as a decal transfer process, a spray process, an inkjet-printing process and the like.

In one aspect of the present disclosure, the decal transfer process can be carried out by the following method. A decal transfer film may be coated with the catalyst ink using a bar coater and sufficiently dried to produce a decal electrode. Regarding the produced decal electrode, by controlling the content of catalyst ink and coating thickness, loading of platinum catalyst can be controlled.

In addition, the decal transfer film may be a heat-resistant polymer, since the decal transfer film should be readily separated and able to endure high temperature heat-treatment conditions, when transferring the decal electrode coated on the decal transfer film to the electrolyte membrane. The heat-resistant polymer may include one or more selected from the group consisting of polytetrafluoroethylene (PTFE), poly(ethylene terephthalate) (PET), poly(butylene terephthalate) (PBT), poly(trimethylene terephthalate)) (PTT), poly(ethylene naphthalate) (PEN) and polyimide (PI). The decal electrode may be hot-pressed with the electrolyte membrane and the decal transfer film may then be removed to manufacture a membrane-electrode assembly.

4) Applying Voltage to the Electrode (S400)

The step of applying a voltage to the electrode (S400) may include applying the voltage to the electrode to remove the second carbon. At this time, a part or the entirety of the second carbon may be removed from the electrode. Application of the voltage to the electrode (S400) may be carried out at a relative humidity of 70% or more. That is, humid gas may be sufficiently supplied to the electrode. When applying a voltage to the electrode while sufficiently supplying the humid gas thereto, electrochemical carbon corrosion occurs, as shown in the following Reaction Schemes 3 and 4, and at the same time, only low crystalline second carbon contained in the electrode can be selectively removed by oxidation.

[Reaction Scheme 3]

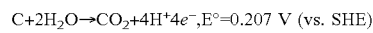

$$C + 2H_2O \rightarrow CO_2 + 4H^+ 4e^-, E° = 0.207 \text{ V (vs. SHE)} \quad [3]$$

[Reaction Scheme 4]

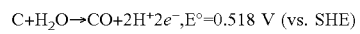

$$C + H_2O \rightarrow CO + 2H^+ 2e^-, E° = 0.518 \text{ V (vs. SHE)} \quad [4]$$

When the relative humidity is less than 70%, a sufficient amount of moisture for carbon corrosion is not present in the electrode and carbon corrosion of the second carbon does not sufficiently occur, making formation of pores in the electrode incomplete.

In addition, application of the voltage to the electrode (S400) may be carried out by applying a voltage of 1.0V to 1.6V to the electrode for 5 seconds to 2 minutes. The voltage applied to the electrode may be 1.0V to 1.6V because, when the voltage is less than 1.0V, carbon corrosion of the second carbon, which is low-crystalline carbon for production of pores, may not sufficiently occur. On the other hand, when the voltage is higher than 1.6V, in addition to the second carbon, the first carbon, which is used as a support of the catalyst metal, may be corroded and removed as well. The voltage may be applied within the range of 1.1V to 1.4V.

Regarding applying a voltage to the electrode (S400), voltage application time as well as the voltage range is important. The voltage application time may be between 5 seconds and 2 minutes. When the voltage application time is shorter than 5 seconds, carbon corrosion of the second carbon, which is low-crystalline carbon for production of pores, may not sufficiently occur, and when the voltage application time is longer than 2 minutes, in addition to the second carbon, the first carbon, which is used as a support of the catalyst metal, may be corroded and removed as well. In one aspect, the voltage application time may be 10 seconds to 30 seconds.

FIG. 2A is a sectional view illustrating a membrane-electrode assembly including the electrode of a membrane-electrode assembly for fuel cells before removal of second carbon in the electrode. As shown in FIG. 2A, the cross-section of the membrane-electrode assembly has a structure in which a gas diffusion layer 30 is formed on an upper surface of an electrode 10 and an electrolyte membrane 20 is formed on a lower surface of the electrode 10. A catalyst metal 11 is supported on a first carbon 12 inside the electrode 10. In addition, the entire surface of the first carbon 12 and the catalyst metal 11 supported on the first carbon is coated with an ionomer binder 13 and a second carbon 14 is mixed with the resulting structure.

FIG. 2B is a sectional view illustrating a membrane-electrode assembly including the electrode of a membrane-electrode assembly for fuel cells, showing formation of sufficient pores after removal of second carbon from the electrode. As shown in FIG. 2B, the second carbon 14 present in the electrode 10 of FIG. 2A is removed by electrochemical carbon corrosion and, at the same time, pores are sufficiently formed, and reactive gases and produced water can effectively move in the electrode of the membrane-electrode assembly.

The electrode for a membrane-electrode assembly for fuel cells manufactured according to the present disclosure can improve porosity in the electrode and enhance mass transport capability of reactive gases by mixing a second carbon having lower crystallinity than a catalyst composite including a catalyst metal-supported first carbon to produce an electrode and applying a voltage to the electrode to selectively remove only second carbon by carbon corrosion.

The electrode for a membrane-electrode assembly for fuel cells manufactured according to the present disclosure can improve performance of fuel cells by enhancing mass transport capability and improve operation stability under various operating conditions.

The electrode for a membrane-electrode assembly for fuel cells manufactured according to the present disclosure can improve porosity of the electrode in a relatively simple and cost-efficient manner and thus reduce costs and improve product value.

The effects of the present disclosure are not limited to those described above. The effects of the present disclosure will be clearly understood from the aforementioned description.

It will be appreciated by those skilled in the art that changes may be made without departing from the principles and spirit of the present disclosure, the scope of which is defined in the appended claims and their equivalents.

What is claimed is:

1. A method for manufacturing an electrode of a membrane-electrode assembly for fuel cells comprising:
    coating a catalyst composite comprising a first carbon and a catalyst metal supported on the first carbon with an ionomer binder;
    mixing the ionomer binder-coated catalyst composite with a second carbon and a solvent to prepare a catalyst ink;
    producing an electrode using the catalyst ink; and
    applying a voltage to the electrode to remove the second carbon, wherein the second carbon has a lower crystallinity than the first carbon, and wherein the removal of the second carbon is carried out at a relative humidity (RH) of 70% or more.

2. The method according to claim 1, wherein the first carbon comprises at least one selected from the group consisting of carbon black, carbon nanotube, carbon nanofiber, carbon nanowire, carbon nanohorn or graphene.

3. The method according to claim 1, wherein the catalyst metal comprises at least one selected from the group consisting of platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo) or yttrium (Y).

4. The method according to claim 1, wherein the coating of the ionomer binder comprises: preparing a mixture consisting of the catalyst composite, an ionomer binder and a solvent; and drying and heat-treating the mixture.

5. The method according to claim 4, wherein the heat-treatment is carried out at a temperature from an alpha transition temperature of the ionomer binder to an alpha transition temperature+100° C. for 10 minutes to 10 hours.

6. The method according to claim 1, wherein the second carbon comprises at least one selected from the group consisting of carbon black, carbon nanotube, carbon nanofiber, carbon nanowire or carbon nanohorn.

7. The method according to claim 1, wherein the second carbon has an at least 10% lower degree of crystallinity than the first carbon.

8. The method according to claim 1, wherein the solvent is at least one alcohol selected from the group consisting of isopropyl alcohol, normal propyl alcohol or ethyl alcohol, deionized water, or a mixture thereof.

9. The method according to claim 1, wherein the catalyst ink comprises 10 to 50% by weight of the ionomer binder and 0.1 to 50% by weight of the second carbon, based on the total weight (%) of the catalyst composite, the ionomer binder and the second carbon.

10. The method according to claim 1, wherein the removal of the second carbon is carried out by applying a voltage of 1.0V to 1.6V to the electrode for 5 seconds to 2 minutes.

* * * * *